United States Patent
Ko et al.

(10) Patent No.: US 8,319,480 B2
(45) Date of Patent: Nov. 27, 2012

(54) APPARATUS AND METHOD OF POWER CONTROL

(75) Inventors: Hee-Sang Ko, Gyeongsangnam-do (KR); Yun-Tae Kang, Gyeongsangnam-do (KR); Jae-Doo Lee, Gyeongsangnam-do (KR)

(73) Assignee: Samsung Heavy Ind. Co., Ltd., Gyeongsangnam-do (KR)

( * ) Notice: Subject to any disclaimer, the term of this patent is extended or adjusted under 35 U.S.C. 154(b) by 0 days.

(21) Appl. No.: 13/419,209

(22) Filed: Mar. 13, 2012

(65) Prior Publication Data

US 2012/0170331 A1 Jul. 5, 2012

Related U.S. Application Data

(60) Division of application No. 12/424,418, filed on Apr. 15, 2009, now Pat. No. 8,159,196, which is a continuation of application No. PCT/KR2009/001697, filed on Apr. 2, 2009.

(30) Foreign Application Priority Data

May 30, 2008 (KR) .................. 10-2008-0050696
Oct. 17, 2008 (KR) .................. 10-2008-0102083

(51) Int. Cl.
*H02J 1/00* (2006.01)
(52) U.S. Cl. ........................................... 322/7
(58) Field of Classification Search .............. 322/7, 24, 322/25, 37
See application file for complete search history.

(56) References Cited

U.S. PATENT DOCUMENTS

| 5,625,545 | A | 4/1997 | Hammon | |
|---|---|---|---|---|
| 7,285,937 | B2 * | 10/2007 | Asada | 322/24 |
| 7,573,243 | B2 * | 8/2009 | Trainer et al. | 322/24 |
| 8,159,196 | B2 * | 4/2012 | Ko et al. | 322/7 |

FOREIGN PATENT DOCUMENTS

| JP | 1993-284656 | 10/1993 |
|---|---|---|
| JP | 2000-009021 | 1/2000 |
| JP | 2005-073362 | 3/2005 |

OTHER PUBLICATIONS

Japanese Office Action and English Abstract thereof regarding Japanese Patent Application No. 2011-511494, issued on Sep. 4, 2012, entitled "Apparatus and Method of Power Control".

* cited by examiner

*Primary Examiner* — Nguyen N Hanh
(74) *Attorney, Agent, or Firm* — Brinks Hofer Gilson & Lione

(57) ABSTRACT

The present disclosure is related to a power control apparatus and a method for controlling power, more specifically to a power control apparatus that controls the risk of overcurrent in a power generator when the voltage in the power grid is low. In accordance with an embodiment of the present disclosure, a power control apparatus that controls power in a power generation system including a generator generating power can include a current comparator, which calculates an error current by using a difference between a current measured at the generator and a rated current of the generator, a controlling unit, which calculates a real power value by receiving the error current and outputs a switch driving signal corresponding to the calculated real power value, a switch, which is operated by the switch driving signal, and a resistance device, which is coupled to the switch to consume the error current.

6 Claims, 8 Drawing Sheets

APPARATUS AND METHOD OF POWER CONTROL

CROSS-REFERENCE TO RELATED APPLICATIONS

This application is a divisional of U.S. application Ser. No. 12/424,418, which claims the benefit of priority under 35 U.S.C §§120,365, and 371 to Patent Cooperation Treaty Patent Application No. PCT/KR2009/001697, filed on Apr. 2, 2009, which claims the benefit of Korean Application Nos. 10-2008-0050696, filed May 30, 2008, and 10-2008-0102083, filed Oct. 17, 2008. The disclosures of the above applications are incorporated herein by reference.

FIELD OF THE DISCLOSURE

The present disclosure is related to a power control apparatus and a method for controlling power, more specifically to a power control apparatus that controls the risk of overcurrent in a power generator when the voltage in the power grid is low.

DISCUSSION OF THE RELATED ART

Generally, electric power systems, such as power generation systems and power transmission systems, have some protection device or mechanism to control the risk of overcurrent and overvoltage in order to maintain a stable power grid.

In the conventional technology, an electric power system uses a 3-phase AC/CD/AC pulse-width modulation (PWM) converter for its power converter. A converter, which is connected to AC power, an inverter, which is connected to the load, and a DC capacitor, which serves as a buffer between the converter and the inverter, have been connected to such power converter. An electrolytic capacitor has been commonly used for the DC capacitor, especially as a filter or an energy buffer because of the large capacity compared to its relatively low cost.

The capacitor may produce heat due to electric currents, reducing the capacitance and shortening the lifetime of the capacitor. Thus, it is required that the capacitance of the capacitor be precisely measured or estimated in the electric power system including a DC capacitor, in order to diagnose the lifetime of the capacitor and anticipate the replacement time of the capacitor.

However, in order to measure the capacitance, it is required that the capacitor be separated from the system.

Furthermore, even though the capacitance may be estimated relatively accurately through a number of experimental results and algorithms, without separating the capacitor from the system, the electric power system does not come equipped with a device that can control power so as to prevent the power generation system from being separated from the power grid when an accident occurs during the system operation.

In the conventional technology, the electric power system includes a power control apparatus encompassing a DC-DC converter, which converts a source of direct current (DC) from one voltage level to another. Here, the power control apparatus includes the DC-DC converter inside the power converter, and may be placed between the converter and the inverter. Therefore, the DC-DC converter may control power by limiting the direct current between the converter and the inverter, or converting the direct current into DC voltage.

However, the conventional electric power system is not capable of controlling the power by detecting the change in electric current in real time to prevent the power generation system from being separated from the power grid when an accident occurs during the system operation.

Moreover, the conventional electric power system may not meet the conditions required for the continuous operation of the system in the event of low voltage in the system.

SUMMARY

The present disclosure can prevent a generator from being separated from the power grid, by using a resistance device to detect and control an overcurrent induced above a rated current in the event of low voltage in the power grid.

The present disclosure can also prevent a generator from being separated from the power grid, by using a resistance device in a direct current capacitor of a power converting unit, which is connected to the generator, to detect and control an overvoltage induced above a rated voltage in the event of low voltage in the power grid.

Moreover, the present disclosure can provide a more reliable quality of power by implementing an efficient power generation system in which a generator equipped with a power converting unit is well connected to the power grid and maintained, regardless of the types of the generator.

DETAILED DESCRIPTION OF THE DISCLOSURE

Certain embodiments in accordance with the present disclosure will be described in more detail through the below description with reference to the accompanying drawings.

Figure 1:
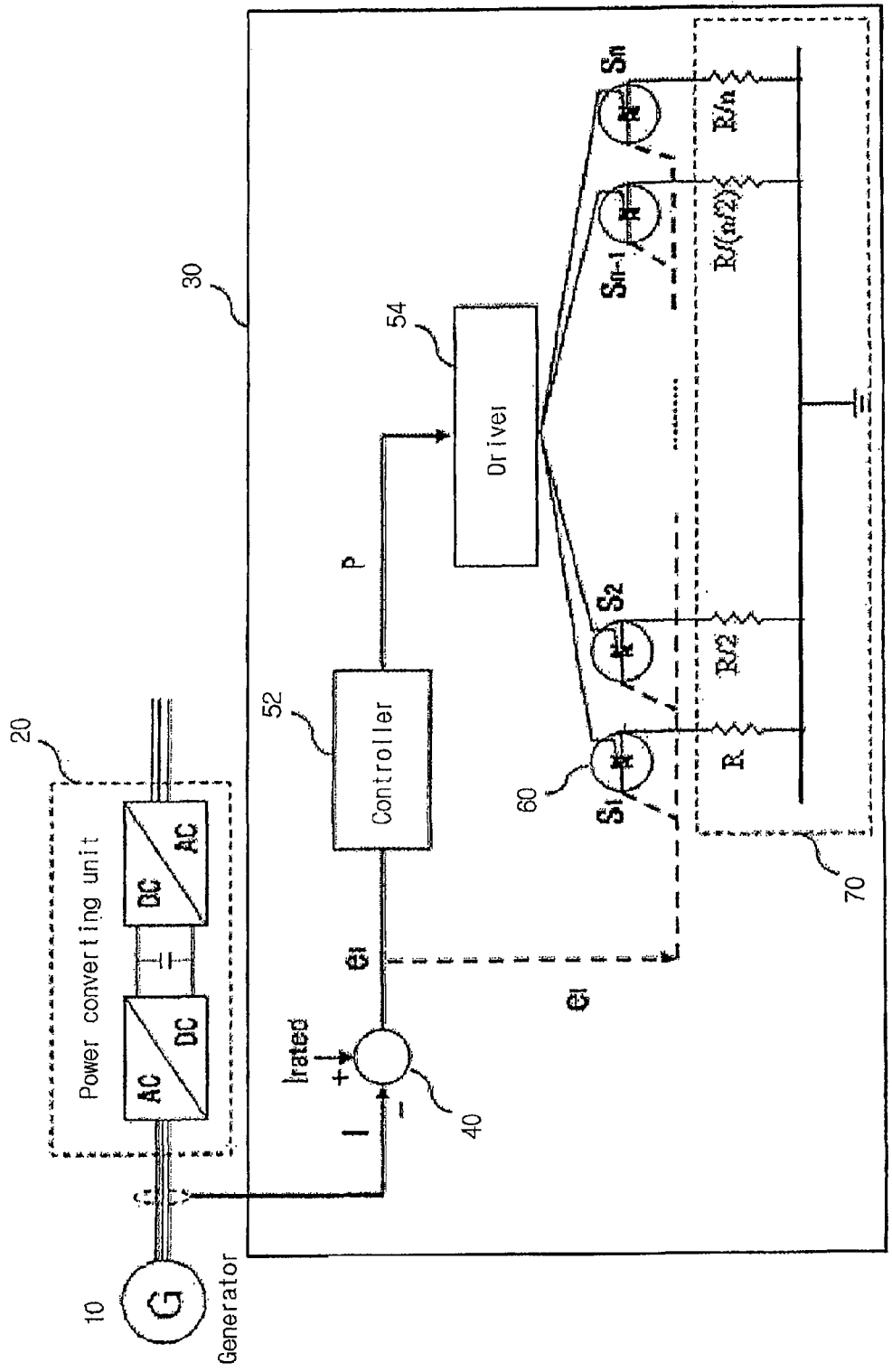
FIG. 1 illustrates the configuration of a power generation system including a power control apparatus in accordance with an embodiment of the present disclosure.
Figure 2:
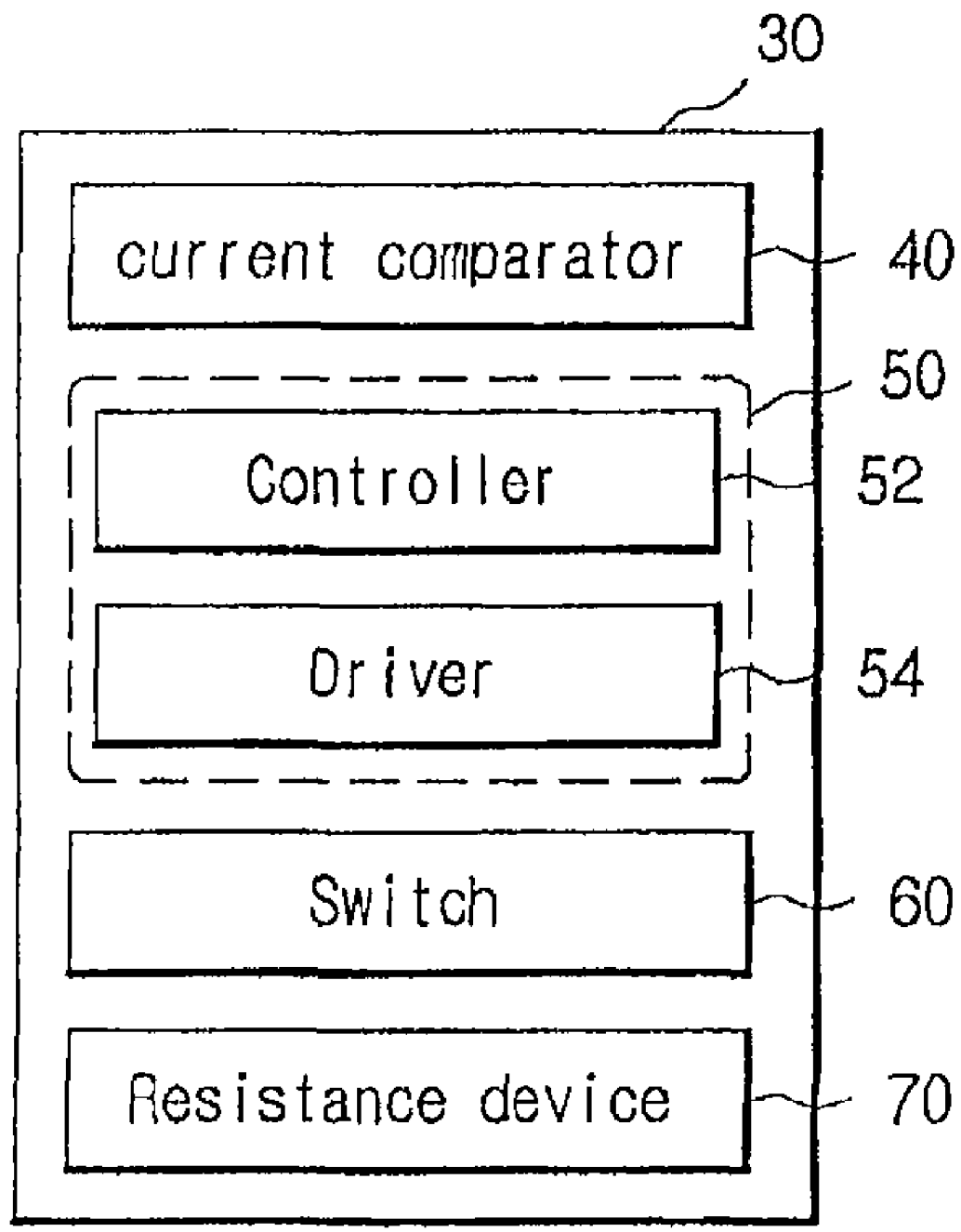
FIG. 2 is a block diagram of a power control apparatus in accordance with an embodiment of the present disclosure.

FIG. 1 illustrates the configuration of a power generation system including a power control apparatus in accordance with an embodiment of the present disclosure, and FIG. 2 shows a block diagram of a power control apparatus in accordance with an embodiment of the present disclosure.

Figure 7:
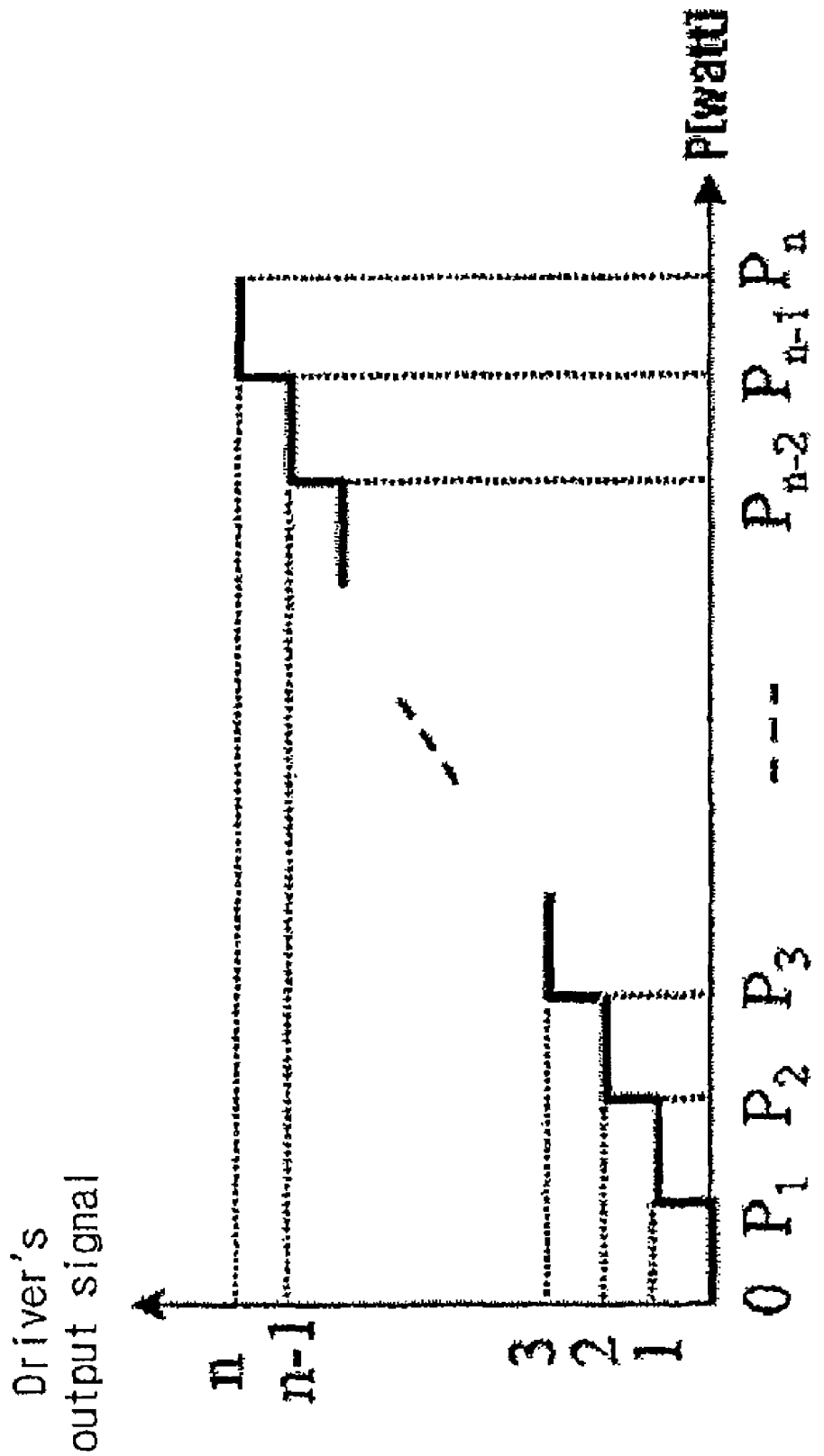
FIGS. 7 and 8 illustrate a power control apparatus and a method of controlling power in accordance with an embodiment of the present disclosure.
Figure 8:
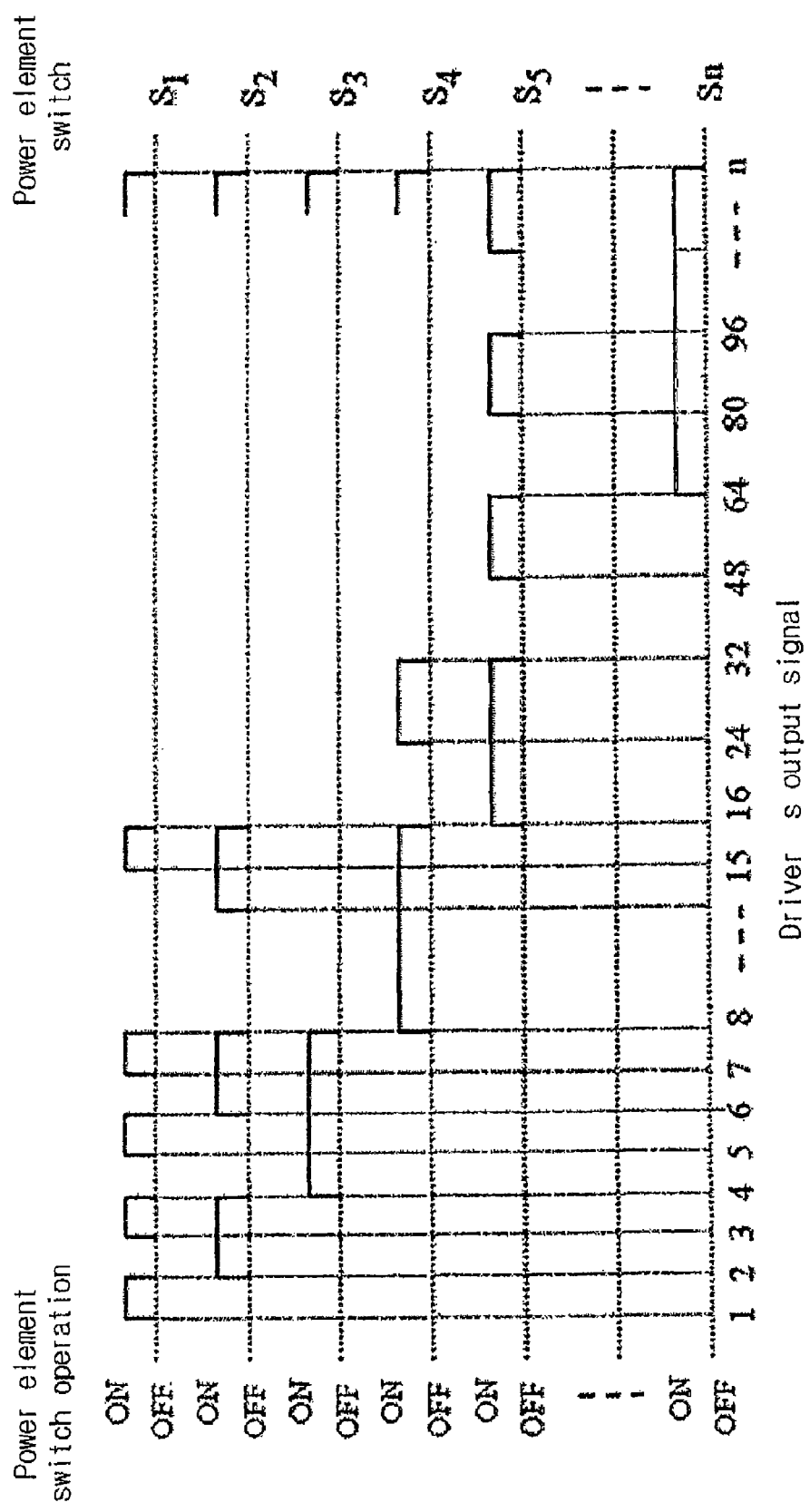

Furthermore, FIGS. 7 and 8 illustrate a power control apparatus and a method of controlling power in accordance with an embodiment of the present disclosure. Hereinafter, the following description will refer to FIGS. 7 and 8 when deemed necessary.

Referring to FIGS. 1 and 2, a power generation system in accordance with an aspect of the present disclosure includes a generator 10, a power converting unit 20, which is connected to the generator 10 and converts power generated from the generator 10, and a power control apparatus 30, which controls overcurrents by using electric currents measured at the power converting unit 20 and the generator 10.

Although it is preferred that the power generation system in accordance with an aspect of the present disclosure is applied in a wind power generation system, it shall be evident to those of ordinary skill in the art that the present disclosure is not restricted to the wind power generation system and can be applied to any power generation system using natural powers.

More specifically, the generator 10 in accordance with an aspect of the present disclosure may be an electric power generating device for generating power. The generator 10 can be a squirrel cage induction generator or a permanent magnet generator, and it shall be evident to those of ordinary skill in the art that any generator that can be used for a generator can be applied to the present disclosure.

Next, the power converting unit 20 is a power converting device that is connected to the generator 10 and can steadily supply power generated by the generator 10.

The power converting unit 20 can include a converter (not illustrated), which converts an alternating current into a direct current, and an inverter (not illustrated), which converts a direct current into an alternating current.

The power converting unit 20 can convert unstable power generated by the generator 10 into a constant output, by using the converter and the inverter, thereby producing more reliable quality of electric power.

Next, the power control apparatus 30 includes a current comparator 40, which is connected to a generator generating power and calculates an error current by comparing a current measured at the generator and a rated current of the generator, a controlling unit 50, which calculates a real power value by receiving the error current and outputs a switch driving signal corresponding to the calculated real power value, a switch 60, which is operated by the switch driving signal of the controlling unit 50, and a resistance device 70, which is connected to the switch 60 and consumes the error current.

The current comparator 40 calculates an error current ($e_I$), which is a difference in current, by comparing a current (I) measured at a rotor of the generator 10 and a rated current ($I_{rated}$) of the rotor. Here, the rated current ($I_{rated}$) is a current that is required for stable supply of power, and can be predetermined by an operator.

The controlling unit 50 includes a controller 52, which performs controlling by receiving the error current ($e_I$), and a driver 54, which controls the operation of a plurality of switches in accordance with a real power (P), which is a control value of the controller 52.

The controller 52 can be one of a proportional (P) controller, a proportional derivative (PD) controller, a proportional integral (PI) controller and a proportional integral derivative (PID) controller, and can perform linear control.

The driver 54 can control the operation of the plurality of switches by outputting a driving signal to each of the plurality of switches in accordance with a real power value calculated by the controller 52.

Figure 4:
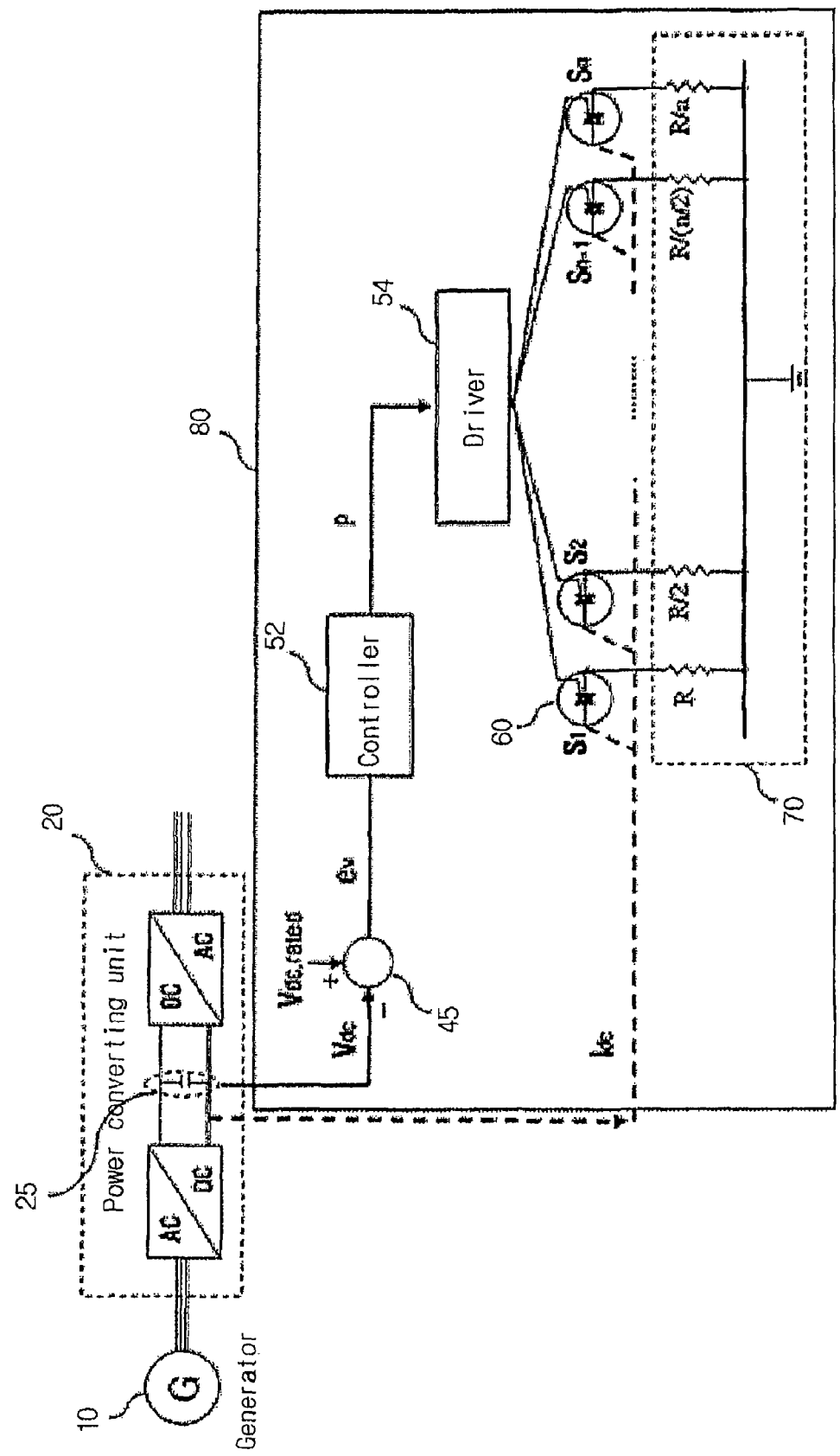
FIG. 4 illustrates the configuration of a power generation system including a power control apparatus in accordance with another embodiment of the present disclosure.

As illustrated in FIG. 4, the driver 54 can transfer an output signal of the driving signal that varies depending on the real power value.

The driver 54 can drive an n number of switches (n being a natural number) that correspond to a calculated real power value selected from pre-determined table values.

As illustrated in FIG. 8, the table values are constituted by switches being driven in accordance with the calculated real power value and the resistance value of resistance components connected to the switches. In order to consume overcurrents corresponding to the real power value, an appropriate n number of switches (n being a natural number) may be selected.

The switch 60 is operated by the switch driving signal of the controlling unit 50, and can guide an error current to the resistance device 70.

The switch 60 can be a plurality of power element switches, and it shall be evident to those of ordinary skill in the art that a switch commonly used for controlling power can be used for the switch 60. For example, a thyristor can be used as the power element switch. In the following description, the thyristor will be used as an example of the power element switch.

The resistance device 70 includes a resistance component that is connected to the switch and consumes an error current in case the error current is distributed.

The resistance device 70 can include a plurality of resistance components. Each of the plurality of resistance components can be connected to each of the plurality of switches 60, respectively, and thus an error current can be consumed at a corresponding resistance component in accordance with the operation of the switches 60. Here, the plurality of resistance components can have different resistance values from one another so as to select the switch 60 driven in accordance with the real power value.

For example, in case the controller 52 is constituted by a proportional integral (PI) controller, the real power (P) can be calculated by the following equation. Here, it shall be assumed that a proportional gain of the proportional integral controller is 3, an integral gain thereof is 2, and the time thereof is 0.2 seconds.

$$P = 3e_I + 2\int_0^{0.2} e_I(t)dt \qquad \text{Mathematical Equation 1}$$

Here, if it is assumed that the rated current ($I_{rated}$) is 1 ampere and the measured current (I) is 1.9 amperes, the error current ($e_I$) can be 0.1 ampere. Applied to the above equation, the real power (P) can be 0.26 watts.

Referring to FIG. 7, if it is assumed that P1=0.1 watt, P2=0.2 watts, P3=0.3 watts, . . . , and P10=1 watt, the real power (P) of 0.26 watts, which has been calculated earlier, can be positioned between P2 and P3, and thus the driver's output signal can become 2. Referring to FIG. 8, since the driver's output signal is 2, switch S1 is off, which shows a state of non-operation, and switch S2 is on, which shows a state of operation.

Figure 3:
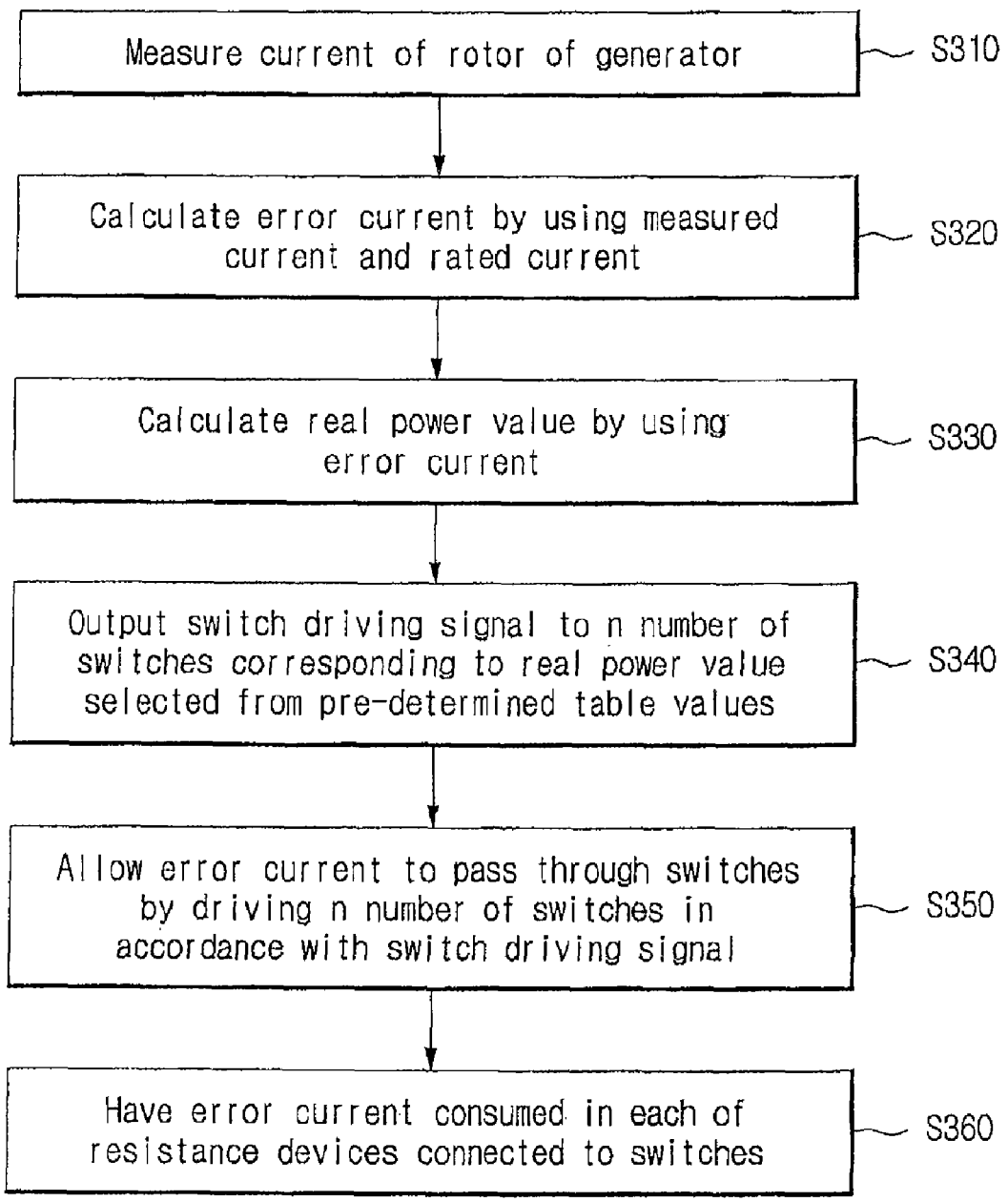
FIG. 3 is a flowchart illustrating a method of controlling power in accordance with an embodiment of the present disclosure.

FIG. 3 is a flowchart illustrating a method of controlling power in accordance with an embodiment of the present disclosure.

In step S310, with reference to FIG. 3, the power control apparatus 30 measures a current of a rotor of the generator 10.

In step S320, the power control apparatus 30 calculates the error current ($e_I$) by using a difference between the measured current (I) and the rated current ($I_{rated}$) of the rotor of the generator 10.

In step S330, the power control apparatus 30 calculates a real power (P) that can control an overcurrent by using the calculated error current ($e_I$), which is the overcurrent that exceeds the rated current ($I_{rated}$).

In step S340, the power control apparatus 30 outputs a switch driving signal to a plurality of thyristors, depending on the calculated real power (P) value.

In step S350, while the plurality of thyristors $S_1, S_2, \ldots,$ and $S_n$ are driven by the switch driving signal, the error current (eI) passes through the switches, i.e., the thyristors $S_1, S_2, \ldots,$ and $S_n$.

The operation of the switches will be described in more detail with reference to FIGS. 7 and 8. In the power control apparatus 30, if the real power (P) value is $P_3$, the switch driving signal becomes 3. Then, if the switch driving signal is 3, the switches $S_1$ and $S_2$ are turned on and the remaining switches are turned off. Here, the switch to be driven in accordance with the real power value can be selected in accordance with a combination of the resistance values of resistance components that are connected to the switches. This creates a set that can be saved as a table in the power control apparatus 30 (more specifically, in the driver 54) and can be used.

Therefore, the power control apparatus 30 can efficiently consume an error current by transferring a switch driving signal to an n number of switches (n) being a natural number) that are to be driven in accordance with the real power value.

In step S360, the power control apparatus 30 consumes the error current ($e_I$) at a resistance component.

Figure 5:
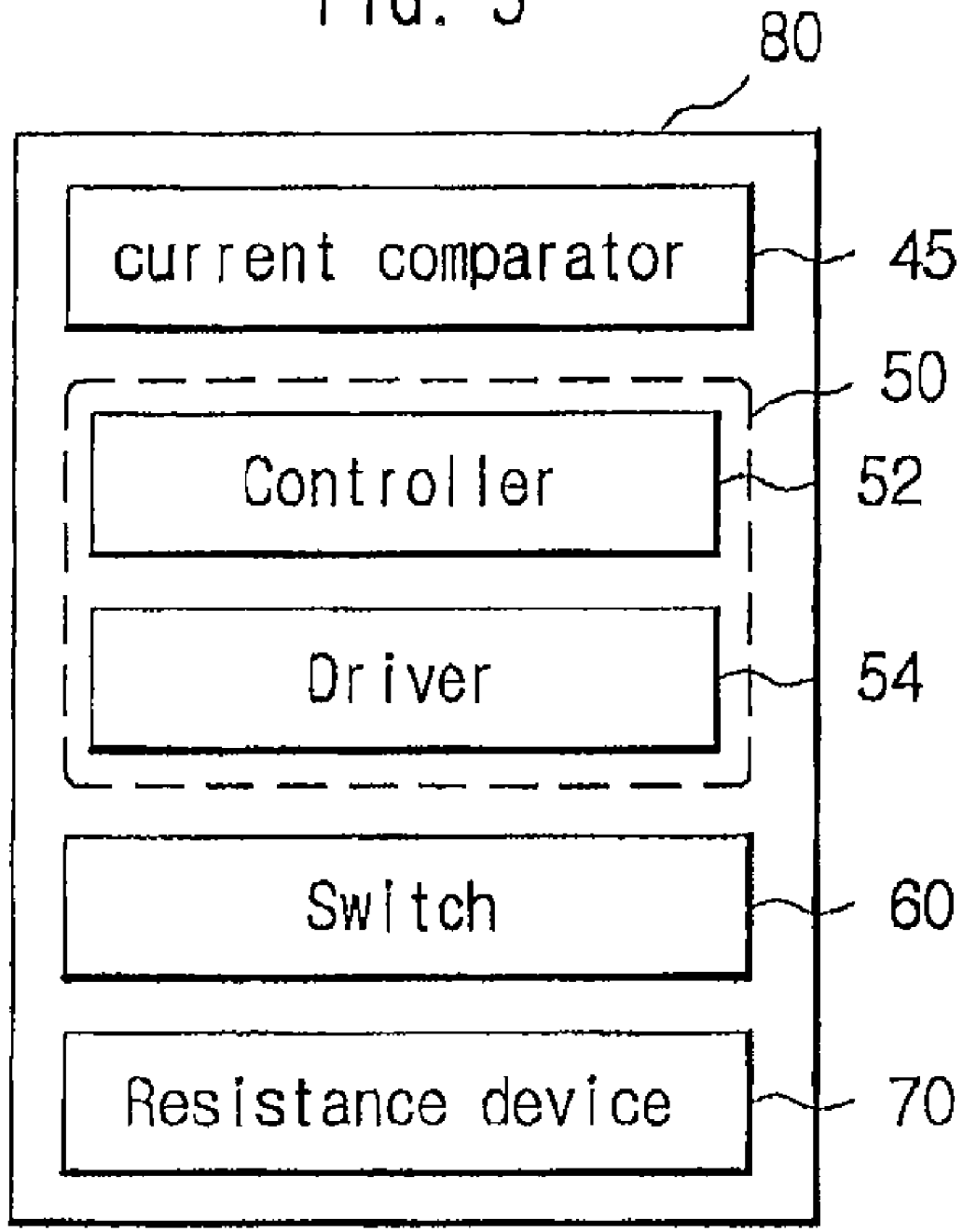
FIG. 5 is a block diagram of a power control apparatus in accordance with another embodiment of the present disclosure.

FIG. 4 illustrates the configuration of a power generation system including a power control apparatus in accordance with another embodiment of the present disclosure, and FIG. 5 is a block diagram of a power control apparatus in accordance with another embodiment of the present disclosure.

Referring to FIGS. 4 and 5, a power generation system in accordance with another embodiment of the present disclosure includes the generator 10, the power converting unit 20, which is connected to the generator 10 and converts power generated by the generator 10, and a power control apparatus 80, which controls overcurrents by using voltages measured at a direct current capacitor 25 of the power converting unit 20. Here, the overcurrent can be a current ($I_{dc}$) that is received from the direct current capacitor 25.

Below, no redundant description of the power generation system including the power control apparatus in accordance with an earlier embodiment of the present disclosure will be repeated.

The power converting unit 20 can include a converter (not illustrated), which converts an alternating current into a direct current, an inverter (not illustrated), which converts a direct current into an alternating current, and the direct current capacitor 25, which connects the converter and the inverter with each other.

The power converting unit 20 can convert unstable power generated by the generator 10 into a constant output by using the converter and the inverter, thereby producing a more reliable quality of power.

Next, the power control apparatus 80 includes a voltage comparator 45, which calculates an error voltage by comparing a voltage measured at the direct current capacitor 25 converting a direct current into an alternating current and a rated current of the direct current capacitor 25, the controlling unit 50, which calculates a real power value by receiving the error voltage and outputs a switch driving signal corresponding to the calculated real power value, the switch 60, which is operated by the switch driving signal of the controlling unit 50, and the resistance device 70, which is connected to the switch 60 and consumes an error current corresponding to the error voltage. Here, the error current corresponding to the error voltage can be an overcurrent that exceeds the rated current and can be a current ($I_{dc}$) that is received from the direct current capacitor 25.

The voltage comparator 45 calculates an error voltage ($e_V$), which is a voltage difference, by comparing a measured voltage ($V_{dc}$), which is measured at the direct current capacitor 25, and a rated voltage ($V_{dc,rated}$) of the direct current capacitor 25. Here, the rated voltage ($V_{dc,rated}$) is a voltage for stable supply of power, and can be predetermined by an operator.

The controlling unit 50 includes the controller 52, which performs controlling by receiving the error voltage ($e_V$), and the driver 54, which controls the operation of a plurality of switches in accordance with a real power (P), which is a control value of the controller 52.

The controller 52 can be one of a proportional (P) controller, a proportional derivative (PD) controller, a proportional integral (PI) controller and a proportional integral derivative (PID) controller, and can perform linear control.

The driver 54 can control the operation of the plurality of switches by outputting a driving signal to each of the plurality of switches in accordance with a real power value calculated by the controller 52.

As illustrated in FIG. 7, the driver 54 can transfer an output signal of the driving signal that varies depending on the real power value.

The driver 54 can drive an n number of power element switches (n being a natural number) that correspond to a calculated real power value selected from predetermined table values.

As illustrated in FIG. 8, the table values are constituted by power element switches being driven in accordance with the calculated real power value and the resistance value of resistance components connected to the switches. In order to consume overcurrents corresponding to the real power value, an appropriate n number of switches (n being a natural number) may be selected.

The switch 60 is operated by the switch driving signal of the controlling unit 50, and can guide an overcurrent corresponding to the error voltage ($e_V$) to the resistance device 70.

The switch 60 can be a plurality of power element switches, and it shall be evident to those of ordinary skill in the art that any switch commonly used for controlling power can be used for the switch 60.

The resistance device 70 includes a resistance component that is connected to the switch and consumes an error current in case an overcurrent corresponding to the error voltage ($e_V$) is distributed.

The resistance device 70 can include a plurality of resistance components. Each of the plurality of resistance components can be connected to each of the plurality of switches 60, respectively, and thus an error current corresponding to the error voltage ($e_V$) can be consumed at a corresponding resistance component in accordance with the operation of the switches 60. Here, the plurality of resistance components can have different resistance values from one another, and a switch 60 to be driven in accordance with the real power value can be selected.

For example, in case the controller 52 is constituted by a proportional integral (PI) controller, the real power (P) can be calculated by the following equation. Here, it shall be assumed that a proportional gain of the proportional integral controller is 3, an integral gain thereof is 2, and the time thereof is 0.2 seconds.

$$P = 3e_V + 2\int_0^{0.2} e_V(t)dt \qquad \text{Mathematical Equation 2}$$

Here, if it is assumed that the rated voltage ($V_{dc,rated}$) is 1 volt and the measured voltage ($V_{dc}$) is 1.9 volts, the error voltage ($e_V$) can be 0.1 volt. Applied to the above equation, the real power (P) can be 0.26 watts Referring to FIG. 7, if it is assumed that P1=0.1 watt, P2=0.2 watts, P3=0.3 watts, . . . , and P10=1 watt, the real power (P) of 0.26 watts, which has been calculated above, can be positioned between P2 and P3, and thus the driver's output signal can become 2. Referring to FIG. 8, since the driver's output signal is 2, switch S1 is off, which shows a state of non-operation, and switch S2 is on, which shows a state of operation.

Figure 6:
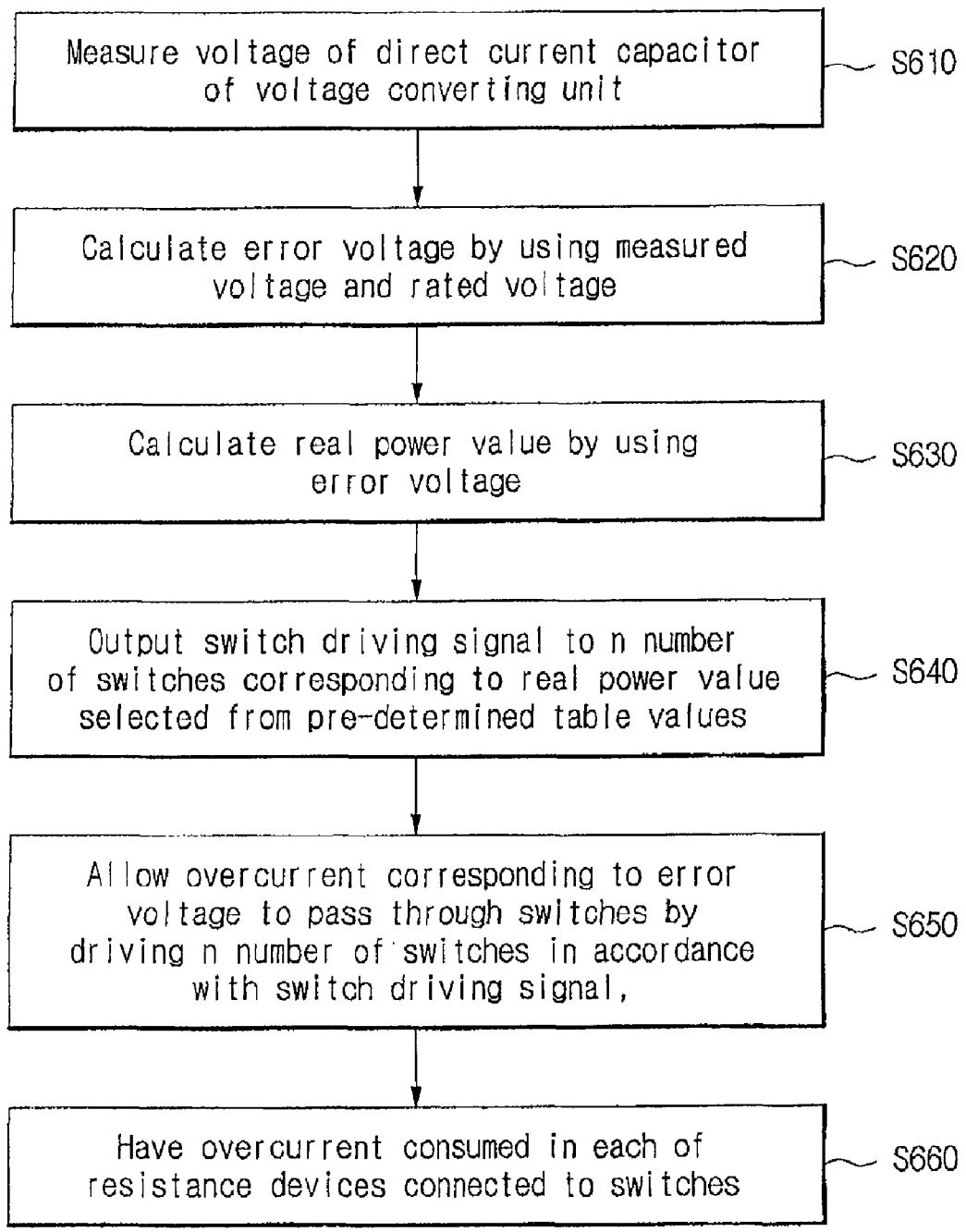
FIG. 6 is a flowchart illustrating a method of controlling power in accordance with another embodiment of the present disclosure.

FIG. 6 is a flowchart illustrating a method of controlling power in accordance with another embodiment of the present disclosure.

In step S610, with reference to FIG. 6, the power control apparatus 80 measures a voltage of the direct current capacitor 25 of the power converting unit 20.

In step S620, the power control apparatus 80 calculates the error voltage ($e_V$) by using a difference between the measured voltage ($V_{dc}$) measured at the direct current capacitor 25 and the rated voltage ($V_{dc,rated}$) of the direct current capacitor 25.

In step S630, the power control apparatus 80 calculates a real power (P) that can control an overcurrent corresponding to an overvoltage by using the calculated error voltage ($e_V$), which is the overvoltage that exceeds the rated voltage ($V_{dc,rated}$).

In step S640, the power control apparatus 80 outputs a switch driving signal to a plurality of power element switches, depending on the calculated real power (P) value.

In step S650, while the plurality of power element switches $S_1, S_2, \ldots,$ and $S_n$ are driven by the switch driving signal, an error current corresponding to the error voltage ($e_V$) passes through the switches, i.e., the power element switches $S_1, S_2, \ldots,$ and $S_n$. Here, the error current is a current that exceeds the rated current.

The operation of the switches will be described in more detail with reference to FIGS. 7 and 8. In the power control apparatus 80, if the real power (P) value is P3, the switch driving signal becomes 3. Then, if the switch driving signal is 3, switches $S_1$ and $S_2$ are turned on and the remaining switches are turned off. Here, the switch to be driven in accordance with the real power value can be selected in accordance with a combination of the resistance values of resistance components that are connected to the switches. This creates a set that can be saved as a table in the power control apparatus 80 (more specifically, in the driver 54) and can be used.

Therefore, the power control apparatus 80 can efficiently consume an error current by transferring a switch driving signal to an n number of switches (n being a natural number) that are to be driven in accordance with the real power value.

In step S660, the power control apparatus 80 consumes an error current corresponding to the error voltage ($e_V$) at a resistance component.

Certain embodiments of the present disclosure can include a computer-readable medium that includes a program of instructions for executing operations that are realized in a variety of computers. The computer-readable medium can include a program command, a local data file or a local data structure, or a combination thereof. The recorded medium can be designed and configured specifically for the present disclosure, or can be a medium that is disclosed to those of ordinary skill in the computer software industry.

While the spirit of the present disclosure has been described in detail with reference to particular embodiments, the embodiments are for illustrative purposes only and shall not limit the disclosure. It is to be appreciated that those skilled in the art can change or modify the embodiments without departing from the scope and spirit of the disclosure. As such, many embodiments other than those set forth above can be found in the appended claims.

What is claimed is:

1. A power control apparatus in a power generation system including a generator generating power, the power control apparatus being connected to a power converter to control power, the power converter including a converter converting an alternating current into a direct current, an inverter converting a direct current into an alternating current and a direct current capacitor being connected to the converter and the inverter in parallel, the power control apparatus comprising:
   a voltage comparator configured to calculate an error voltage, based on a difference between a voltage measured at the direct current capacitor and a rated voltage of the direct current capacitor;
   a controlling unit configured to calculate a real power value by receiving the error voltage and output an output switch driving signal corresponding to the calculated real power value;
   a switch configured to be operated by the switch driving signal; and
   a resistance device coupled to the switch to consume an error current corresponding to the error voltage, wherein the error current is a current being received from the direct current capacitor.

2. The power control apparatus of claim 1, wherein the controlling unit comprises:
   a controller configured to calculate a real power value by receiving the error voltage; and
   a driver configured to output a driving signal to each of a plurality of switches in accordance with the calculated real power value.

3. The power control apparatus of claim 1, wherein the switch is a power element switch.

4. The power control apparatus of claim 3, wherein there are an n number of power element switches, n being a natural number, and the number of the power element switches to be driven is adjusted according to the real power value.

5. The power control apparatus of claim 1, wherein the resistance device comprises an m number of resistance elements, m being a natural number, and the error current is consumed at the resistance element connected to the switch in accordance with the driving signal of the switch.

6. The power control apparatus of claim 1, wherein the power generation system is a wind power generation system.

* * * * *